United States Patent
Chun-Ting et al.

(10) Patent No.: US 7,934,044 B2
(45) Date of Patent: Apr. 26, 2011

(54) METHOD FOR EXPEDITING DATA ACCESS OF UNIVERSAL SERIAL BUS STORAGE DEVICE

(75) Inventors: Liao Chun-Ting, Changhua (TW); Xiong Guang-An, Suzhou (CN); Wang Wei, Suzhou (CN)

(73) Assignee: Realtek Semiconductor Corp., Hsinchu (TW)

( * ) Notice: Subject to any disclaimer, the term of this patent is extended or adjusted under 35 U.S.C. 154(b) by 38 days.

(21) Appl. No.: 12/115,088

(22) Filed: May 5, 2008

(65) Prior Publication Data

US 2008/0282016 A1  Nov. 13, 2008

(30) Foreign Application Priority Data

May 10, 2007  (TW) ................................ 96116714 A

(51) Int. Cl.
*G06F 13/36* (2006.01)
*G06F 13/00* (2006.01)
*G06F 13/20* (2006.01)

(52) U.S. Cl. .............. 710/315; 710/33; 710/34; 710/35; 710/62; 710/305; 710/313

(58) Field of Classification Search .................. 710/315, 710/33, 34, 35
See application file for complete search history.

(56) References Cited

U.S. PATENT DOCUMENTS

| 5,444,709 | A * | 8/1995 | Riddle .......................... 370/474 |
| 7,003,613 | B1 * | 2/2006 | Wang et al. .................. 710/305 |
| 7,102,671 | B1 * | 9/2006 | Asnaashari ................ 348/231.9 |
| 7,149,840 | B1 * | 12/2006 | Kolokowsky ................ 710/313 |
| 7,159,065 | B1 * | 1/2007 | Marlatt ......................... 710/313 |
| 7,237,047 | B2 * | 6/2007 | Ishida et al. .................... 710/52 |
| 7,526,593 | B2 * | 4/2009 | Mandal et al. ................ 710/310 |
| 7,526,594 | B2 * | 4/2009 | Tseng et al. .................. 710/310 |
| 7,590,765 | B2 * | 9/2009 | Nagao et al. ...................... 710/5 |
| 7,640,378 | B2 * | 12/2009 | McLeod .......................... 710/29 |
| 2006/0251087 | A1 * | 11/2006 | Ng et al. ....................... 370/401 |
| 2007/0198753 | A1 * | 8/2007 | Hamid ............................ 710/33 |
| 2008/0263242 | A1 * | 10/2008 | Bica et al. ....................... 710/62 |

FOREIGN PATENT DOCUMENTS

| CN | 1875339 A | 10/2004 |
| CN | 1889061 A | 7/2006 |

OTHER PUBLICATIONS

Atmel—"AVR273: USB Mass Storage Implementation", Mar. 2006, 25 pages.*
"Design Considerations for USB Mass Storage" by Steve Kolokowsky—Jun. 12, 2002: 34 pages.*
Universal Serial Bus Specification—3 pages only, Apr. 27, 2000.*
Universal Serial Bus Mass Storage Class Specification Overview—Revision 1.2; Jun. 23, 2003; 7 pages.*
Universal Serial Bus Mass Storage Class—"Bulk-Only Transport" Revision 1.0; Sep. 31, 1999: 22 pages.*

* cited by examiner

*Primary Examiner* — Brian T Misiura
(74) *Attorney, Agent, or Firm* — Thomas, Kayden, Horstemeyer & Risley, LLP

(57) ABSTRACT

A method for expediting data access of a Universal Serial Bus (USB) storage device is disclosed. In a first embodiment, a data transmission procedure without the need of sending command block wrappers (CBW) is executed if a read command for reading data of a large memory space is received, and the addresses of the read commands are continuous. In a second embodiment, several write commands of continuous addresses are stored in a buffer area and combined into a larger single request command before sending to the USB storage device, so as to reduce the number of times of sending CBW and command status wrapper (CSW) required for the data transmission. In a third embodiment, more data are read and stored in a buffer area in advance when a read command is received, such that the next command can read data from the buffer area to improve the speed of reading data.

3 Claims, 7 Drawing Sheets

METHOD FOR EXPEDITING DATA ACCESS OF UNIVERSAL SERIAL BUS STORAGE DEVICE

FIELD OF THE INVENTION

The present invention relates to Universal Serial Bus (USB) storage devices, and more particularly to a method for expediting data access of a USB storage device.

BACKGROUND OF THE INVENTION

As the data volume processed by a computer becomes increasingly larger, computer peripherals demand a much wider transmission bandwidth. Although various bus architectures are available, yet they still have the drawbacks of low transmission rate and high cost. Unlike traditional buses, the Universal Serial Bus (USB) features the advantages of hot plug and high data transmission rate, and thus USB is used extensively in various computer systems.

The aforementioned USB transmission protocol defines four types of transmission modes: (1) interrupt transfers, (2) bulk transfers, (3) isochronous transfers, and (4) control transfers, wherein the main feature of the data transmission of the bulk transfers resides on that data is not generated periodically, a large volume of data occurs at a specific time only, and the data transmission requires a very broad bandwidth. The bulk transfers mode is suitable for USB mass storage devices such as printers and scanners.

FIG. 1 illustrates a software structure of a USB storage device corresponding to a host system operating in bulk transfers mode. The software structure of the host system includes, sequentially from top to bottom, a USB host controller driver layer 11, a USB protocol driver layer 12, a bulk transfers layer 13, a small computer system interface (SCSI) layer 14, a block device processing layer 15, and a file system layer 16.

FIG. 2 illustrates a flow chart of a procedure of accessing data of a bulk transfers protocol at a host system. The processing procedure includes the steps of:

Step 20: receiving a SCSI request block (SRB) issued by a SCSI layer 14 from a bulk transfers layer 13;

Step 21: wrapping a command included in the SRB into a command block wrapper (CBW), and sending the CBW to a USB storage device through a USB bulk-out transaction;

Step 22: executing a data-out or data-in transmission; and

Step 23: receiving a command status wrapper (CSW) to confirm whether or not the access command is processed successfully for this time.

From the description above, one CBW is issued each time when the host system sends an access command; then after the data transmission is completed, a CSW is received to confirm whether or not the transmission is successful before the next data transmission can be performed. If the data reading speed of the storage medium is fast enough, and the data are ready upon each data request, then when performing reading/writing of a large amount of data, it becomes overly burdensome in terms of processing time to send out one CBW command and one CSW command for each packet, resulting in degradation of the overall data transmission rate of the USB system.

SUMMARY OF THE INVENTION

It is therefore one of the objectives of the present invention to provide a method for expediting the data access of a Universal Serial Bus (USB) storage device, wherein the method reduces the number of times of sending a CBW and a CSW from the bulk transfers layer and reduces the actual time interval of the data transmissions of each SRB request, and allows the USB storage device to be in a continuous data reading/writing status for a longer time.

In addition, the present invention provides a method for expediting the data access of a universal serial bus (USB) storage device, enabling a host system to access data in a USB storage device through a USB interface, and the host system having a software structure with a bulk transfers layer and a small computer system interface (SCSI) layer, and the method includes the steps of:

(a) receiving an access command issued by the SCSI layer from the bulk transfers layer;

(b) determining whether or not a to-be-accessed memory space of the access command is greater than a threshold value; if said to-be-accessed memory space of said access command is greater than said threshold value, then executing Step (c);

(c) determining whether or not the logical addresses of the access commands are continuous; if yes, then executing Step (d); and (d) executing a continuous data access procedure according to the determination result of Steps (b) and (c), and if the determination results of Steps (b) and (c) are affirmative, then a data transmission procedure without a need of sending out a CBW is executed.

In addition, the present invention further provides a method for expediting the speed of writing data of a USB storage device, and the method uses a plurality of buffer area for storing several write commands in continuous logical addresses and combining the write commands into a single request command, and then the single request command is sent to the USB storage device by a sending thread. This method can reduce the number of times of continuously sending the CBW and CSW when data are transmitted and also can shorten the time interval between actual data transmissions.

In addition, the present invention further provides a method for expediting the speed of reading data of a USB storage device, and the method uses a buffer area for storing the data with larger memory space from the USB storage device. When the logical address of current read command exists in the buffer area, then the data is read from the buffer area. This method can reduce the number of times of continuously sending the CBW and CSW when data are transmitted and also can shorten the time interval between actual data transmissions.

This invention may also be said broadly to consist in the parts, elements and features referred to or indicated in the specification of the application, individually or collectively, and any or all combinations of any two or more of said parts, elements or features, and where specific integers are mentioned herein which have known equivalents in the art to which this invention relates, such known equivalents are deemed to be incorporated herein as if individually set forth.

BRIEF DESCRIPTION OF THE DRAWINGS

The subject matter regarded as the invention is particularly pointed out and distinctly claimed in the concluding portion of the specification. The invention together with features and advantages thereof may best be understood by reference to the following detailed description with the accompanying drawings in which:

DETAILED DESCRIPTION OF THE PREFERRED EMBODIMENTS

In the related figures of embodiments of the present invention, the same referring numerals are used for the same components in accordance with the present invention.

While a computer host writes/reads a large batch of data or a file requiring/occupying a large memory space stored in the USB storage device, for most of the time the logical addresses of the devices corresponding to the adjacent read/write requests are continuous. Based on this technical characteristic, the invention provides a method for expediting the speed of reading/writing data of a USB storage device.

Figure 1:
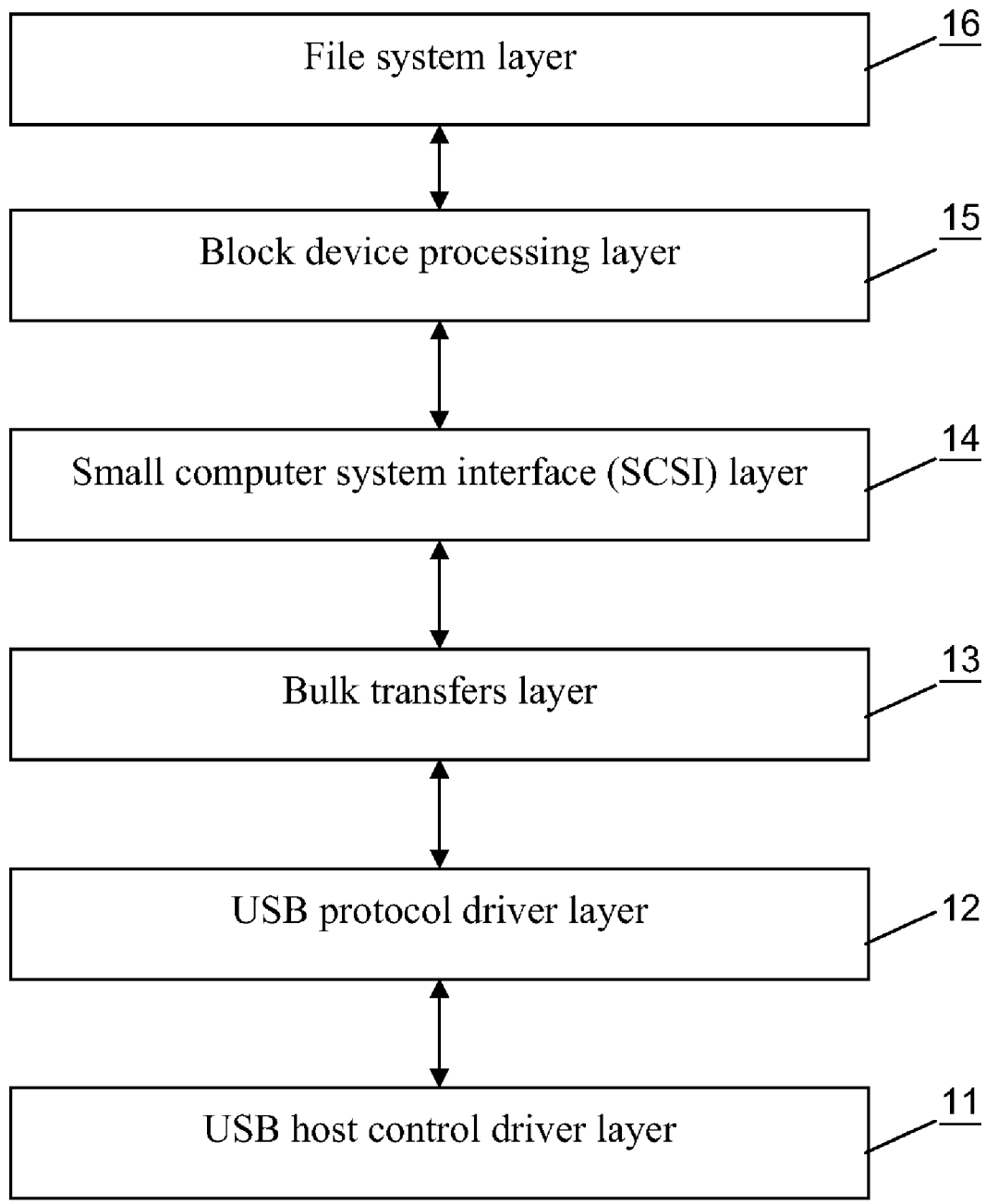
FIG. 1 illustrates a software structure of a host system.
Figure 2:
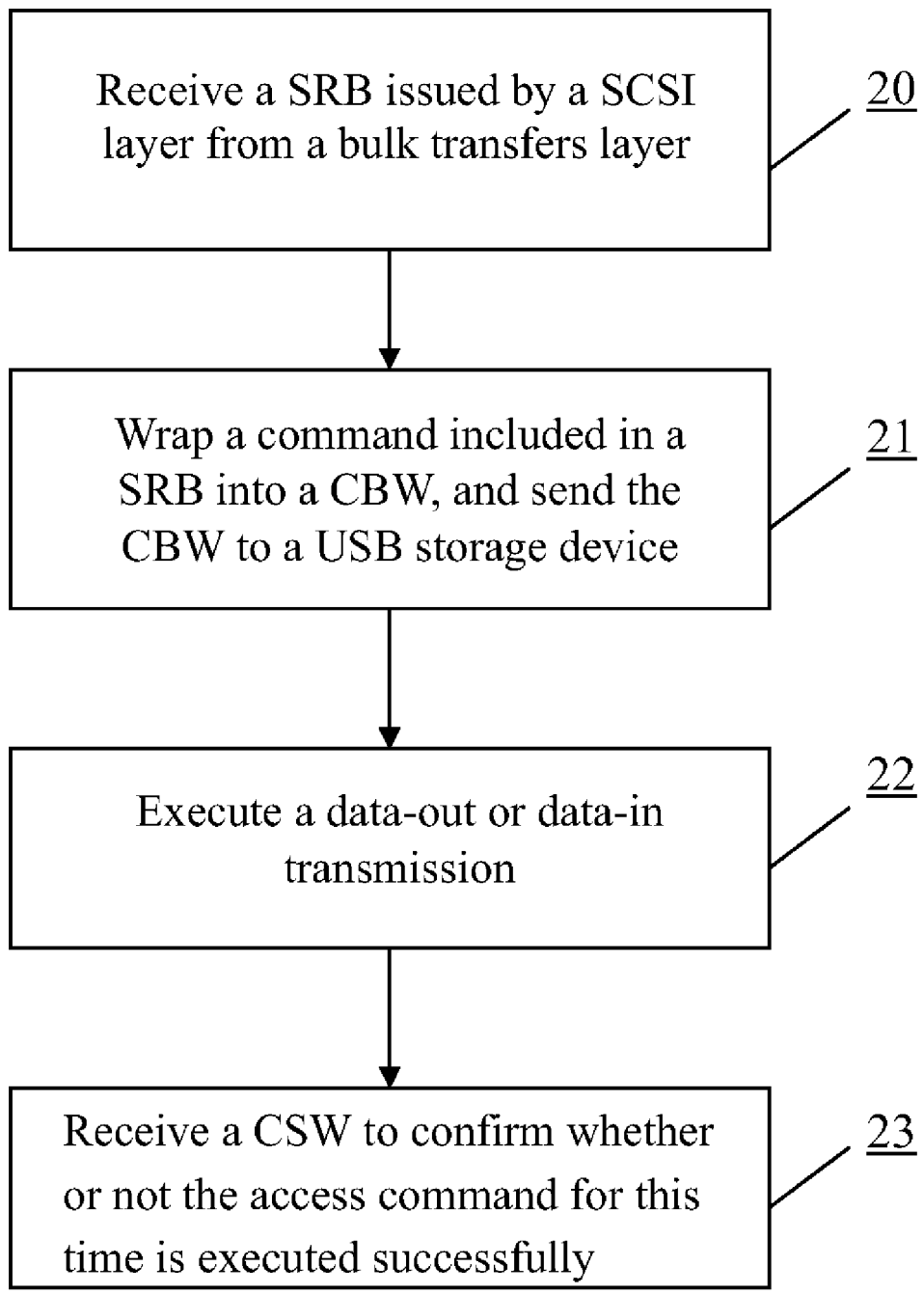
FIG. 2 illustrates a flow chart of executing the data access of a bulk transfers protocol at a host system.
Figure 3:
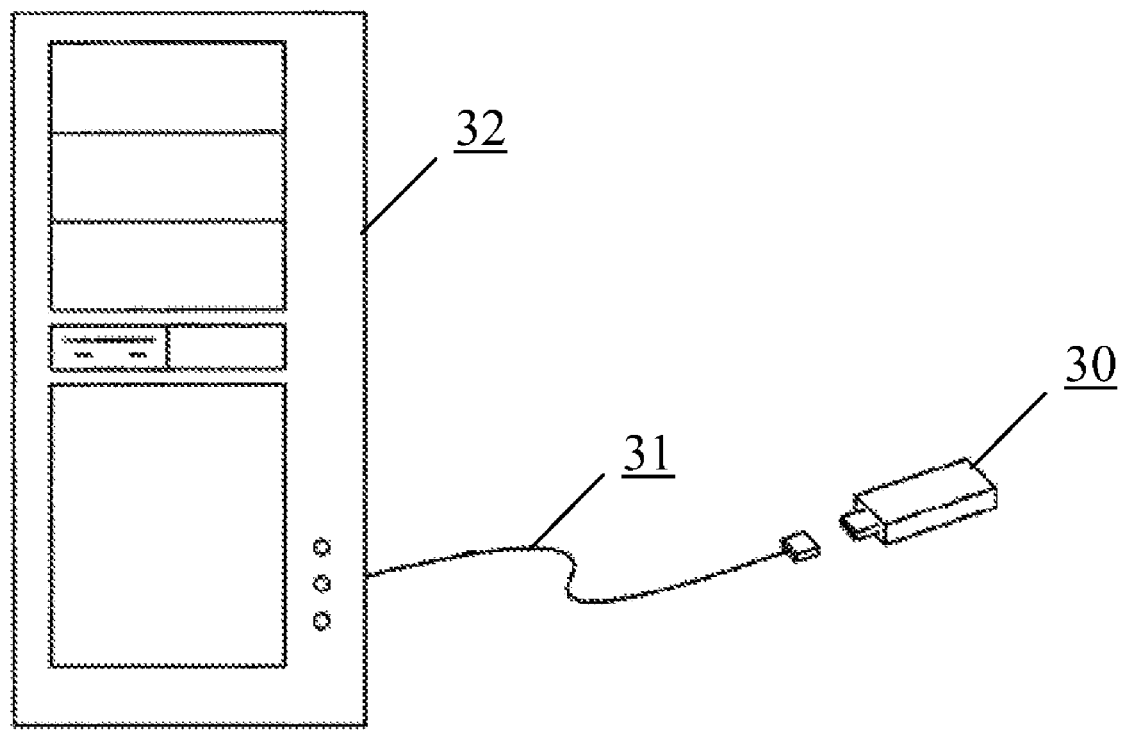
FIG. 3 illustrates an application environment of the invention.

FIG. 3 illustrates a schematic view of an application environment of the invention. A host system 32 executes a data reading/writing procedure in a USB storage device 30 through a USB interface 31 (a USB cable). The host system can be either one of a personal computer, an e-book, or a personal digital assistant, and the USB storage device can be a printer, a scanner, or a USB flash disk. Furthermore as depicted in FIG. 1, the software structure of the host system 32 includes at least a bulk transfers layer and a SCSI layer.

Figure 4:
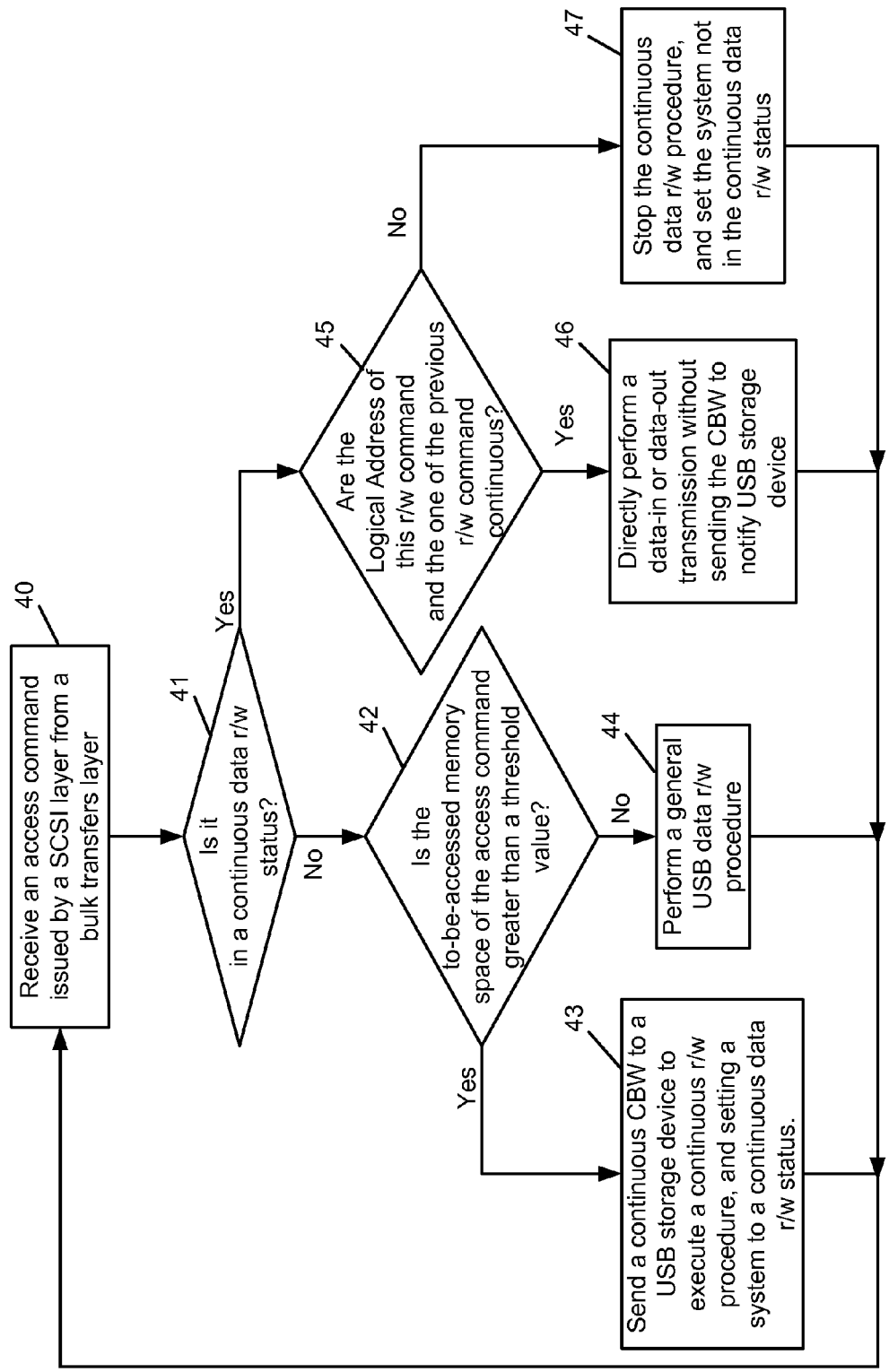
FIG. 4 illustrates a flow chart of a method for expediting the data access of a USB storage device in accordance with an embodiment of the invention.

FIG. 4 illustrates a flow chart of a method for expediting the data access of a USB storage device in accordance with an embodiment of the invention. A continuous data access procedure is selectively executed based on certain conditions, to reduce the number of times of sending CBW and CSW as well as the time interval of actual transmissions of each SRB request. The method includes the steps of:

Step 40: receiving an access command issued by a SCSI layer from a bulk transfers layer; The access command can be a read command.

Step 41: determining whether or not a USB storage device is in a continuous data access status; if the USB storage device is not in a continuous data access status, then executing Step 42; otherwise, executing Step 45. Preferably, the status of the USB storage device can be determined by examining a flag value in this step.

Step 42: determining whether or not a to-be-accessed memory space of the access command is greater than a threshold value as the condition of entering the sequential reading process; if the to-be-accessed memory space of the access command is greater than the threshold value, then executing Step 43, otherwise, executing Step 44. The maximum memory space for a read command in a general host system is 64 Kbytes, and thus in this embodiment the threshold value is set to 64 Kbytes. Therefore, if the memory space of the read command is larger than 64 Kbytes, then Step 43 will be executed, otherwise Step 44 will be executed.

Step 43: sending a continuous CBW to the USB storage device to access data, notifying the USB storage device that a continuous data access procedure is to be performed, and setting the USB storage device to a continuous data access status such as setting a flag value to 1, and then executing Step 40.

Step 44: performing a normal USB data access procedure, and then executing Step 40.

Step 45: determining whether or not the logical addresses of the current access command and the previous access command are continuous; if the logical addresses of the current access command and the previous access command are continuous, then executing Step 46, otherwise, executing Step 47. In this step, the method for determining whether or not the logical addresses are continuous is by examining whether or not the starting address of a current read command subtracted by the starting address of a previous read command is equal to the byte length of the previous read command; if yes, it indicates that the two read commands are continuous, otherwise, the two read commands are not continuous. Accordingly, the logical address included in a read command includes at least a first field for recording whether or not the read command is continuous and a second field for recording the byte length of the read command. The first field records whether or not the read command is continuous with a binary notation, wherein a recorded "1" indicates a continuous status and "0" a non-continuous status.

Step 46: performing a continuous data access procedure, which performs a bulk-in/out process to the USB storage device directly based on the access command, without the need of sending a CBW to notify the USB storage device, and then executing Step 40.

Step 47: stopping the continuous data access procedure, and setting the USB storage device to a status other than the continuous data access status, such as setting the flag value to 0; then executing Step 40. Here if the previously notified large amount data transmission has not been completed, then a stop command will be issued by the SCSI layer, which request the USB device to clear the prepared data, and a corresponding reset operation is performed, which triggers an idle status to wait for the next CBW.

According to a bulk transfers protocol, a CBW is sent before each data transmission takes place, and a CSW is obtained after each data transmission. Therefore, for transmission involving a large amount of data, operations relating to CBW and CSW take up a significant amount of time. With the foregoing method, a continuous data access procedure is executed to reduce the number of times of sending CBW and CSW, and reduce the time interval between actual data transmissions of each read command required for the data transmission, so as to expedite the data reading speed. For example, when this method is used for informing a USB storage device to read a data block of 8 Mbytes, the data reading speed of the USB storage device is increased from 26 Mbytes/s~27 Mbytes/s to over 37 Mbytes/s.

Figure 5:
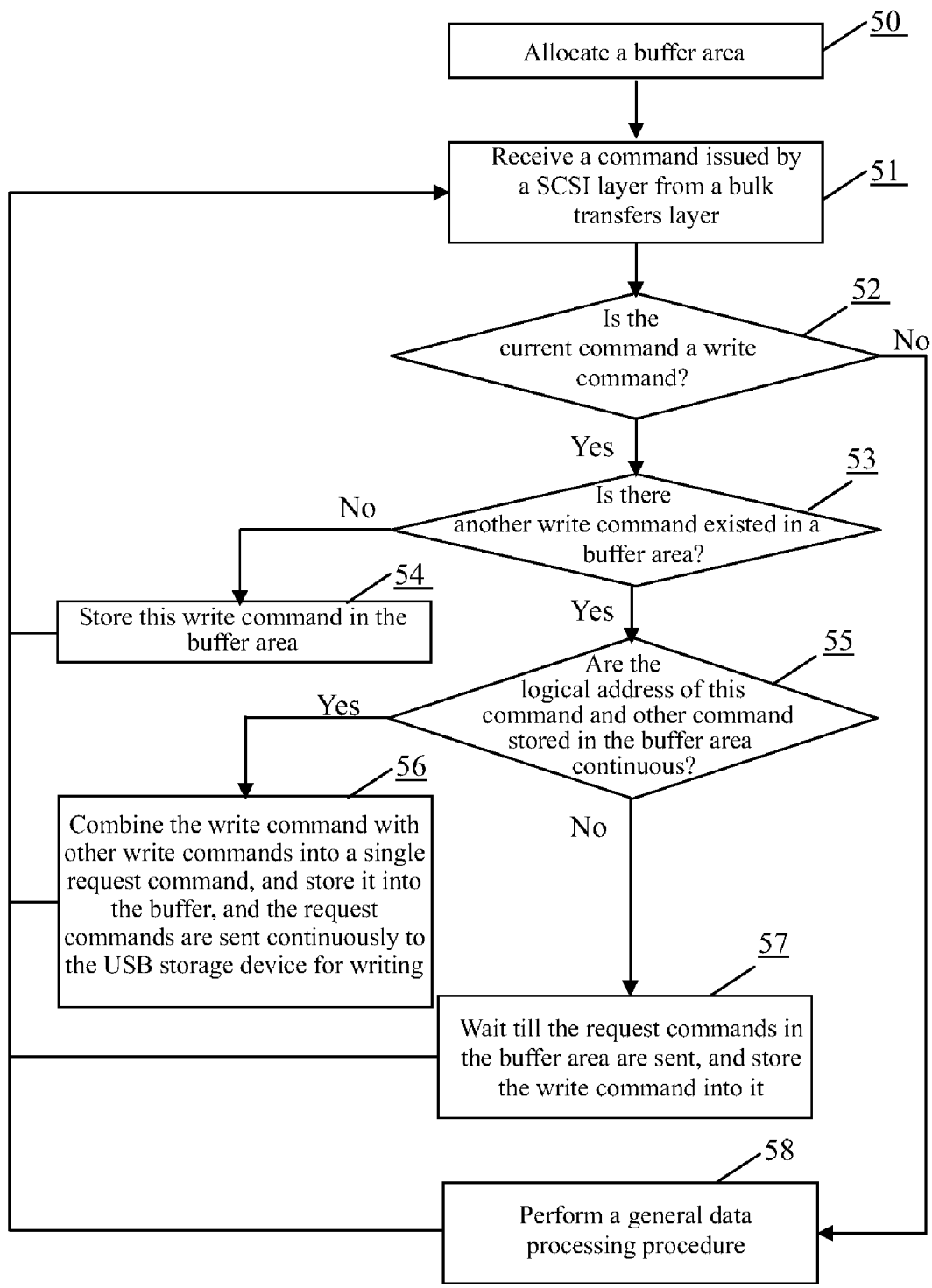
FIG. 5 illustrates a flow chart of a method for expediting the speed of writing data into a USB storage device in accordance with an embodiment of the invention.

FIG. 5 illustrates a flow chart of a method for expediting the speed of writing data into a USB storage device in accordance with another embodiment of the present invention. This embodiment combines a plurality of write commands with continuous logical addresses into a single request command, to improve the data writing speed of the USB storage device. In FIG. 5, the method includes the steps of:

Step 50: allocating a buffer area.

Step 51: receiving a command from a bulk transfers layer by a SCSI layer.

Step 52: determining whether or not the command is a write command; if the command is a write command, then executing Step 53, otherwise executing Step 58.

Step 53: determining whether or not the buffer area stores another write command; if yes, executing Step 55, or else executing Step 54.

Step 54: storing such write command into the buffer area, and executing Step 51.

Step 55: determining whether or not the logical address of said write command and the logical address of the write command stored in the buffer area are continuous; if yes, then executing Step 56, or else executing Step 57.

Step 56: combining this write command with the other write command of a continuous logical address into a single request command, and saving the request command into the buffer area, wherein the request command is constantly sent to the USB storage device for writing data, and executing Step 51.

Step 57: waiting till the request command in the buffer is completely sent, then saving this write command into the buffer area, and executing Step 51.

Step 58: performing a normal USB data processing procedure, and executing Step 51.

In this method, if the buffer area data processing is divided into two parts; one part for receiving SRB, which performs a deferred storage and a combination process if the logical addresses are continuous, and does not perform the combination process if the logical addresses are not continuous; the other part for continuously sending the data stored in the buffer area to the USB device. The parallel operation of the two parts can render an even better performance of said method. With the foregoing deferred storage and combination of the write commands, the number of times for receiving the command status wrappers (CSW) can be reduced, so as to achieve the effect of expediting the data writing speed.

Figure 6:
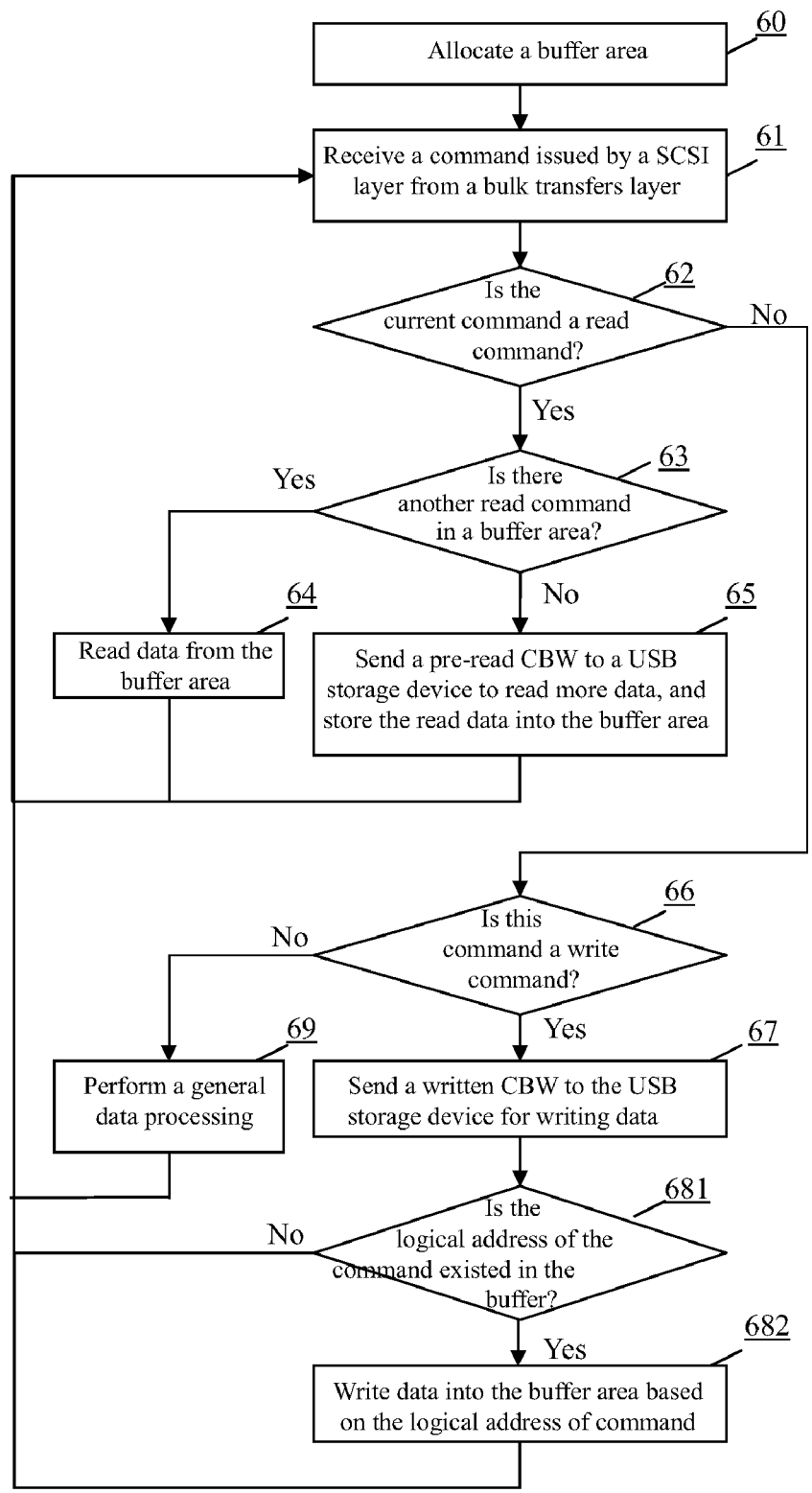
FIG. 6 illustrates a flow chart of a method for expediting the speed of reading data from a USB storage device in accordance with another embodiment of the invention.

FIG. 6 illustrates a flow chart of a method for expediting the speed of reading data from a USB storage device in accordance with yet another embodiment of the invention, more data are read in advance to improve the data reading speed. This method includes the steps of:

Step 60: allocating a buffer area.

Step 61: receiving a command issued by a SCSI layer from a bulk transfers layer.

Step 62: determining whether or not the command is a read command; if the command is a read command, then executing Step 63, or else executing Step 66.

Step 63: determining whether or not the logical address included in the read command exists in the buffer area; if yes, then executing Step 64, or else executing Step 65, wherein this read command intends to read data from a first memory space starting at the logical address of the USB storage device.

Step 64: reading data from the buffer area, and executing Step 61.

Step 65: sending a read CBW to the USB storage device to read data from a second memory space starting at the logical address, storing the data into the buffer area, wherein the second memory space is greater than the first memory space, and the memory space of the buffer area is greater than the second memory space and the first memory space, and then executing Step 61.

Step 66: determining whether or not the command is a write command; if yes, then executing Step 67, or else executing Step 69.

Step 67: sending a write CBW to the USB storage device to load the data, for executing Step 681.

Step 681: confirming whether or not the logical address of this write command exists in the buffer area; if yes, then executing Step 682, or else executing Step 61.

Step 682: writing the data into the buffer area according to the logical address of the write command, so as to maintain data consistency.

Step 69: performing a normal USB data processing procedure.

If the memory space remained in the buffer area is smaller than the second memory space before Step 65 is executed, then other data will be erased to spare sufficient memory spaces for storing the pre-read data.

In addition, before executing Step 65 it can be first determined whether the logical address of this read command and the logical address of a subsequent read command are continuous; if yes, then Step 65 will be executed, or else Step 69 will be executed. Such arrangement can improve the performance and efficiency of this method.

In Step 65, it is necessary to receive a command status wrapper (CSW) to confirm whether or not the read command is processed successfully for this time, after more data are read from the USB storage device. Therefore, the foregoing data pre-reading method can effectively reduce the number of times of receiving command status wrappers (CSW), and can further improve the efficiency of reading data.

Figure 7:
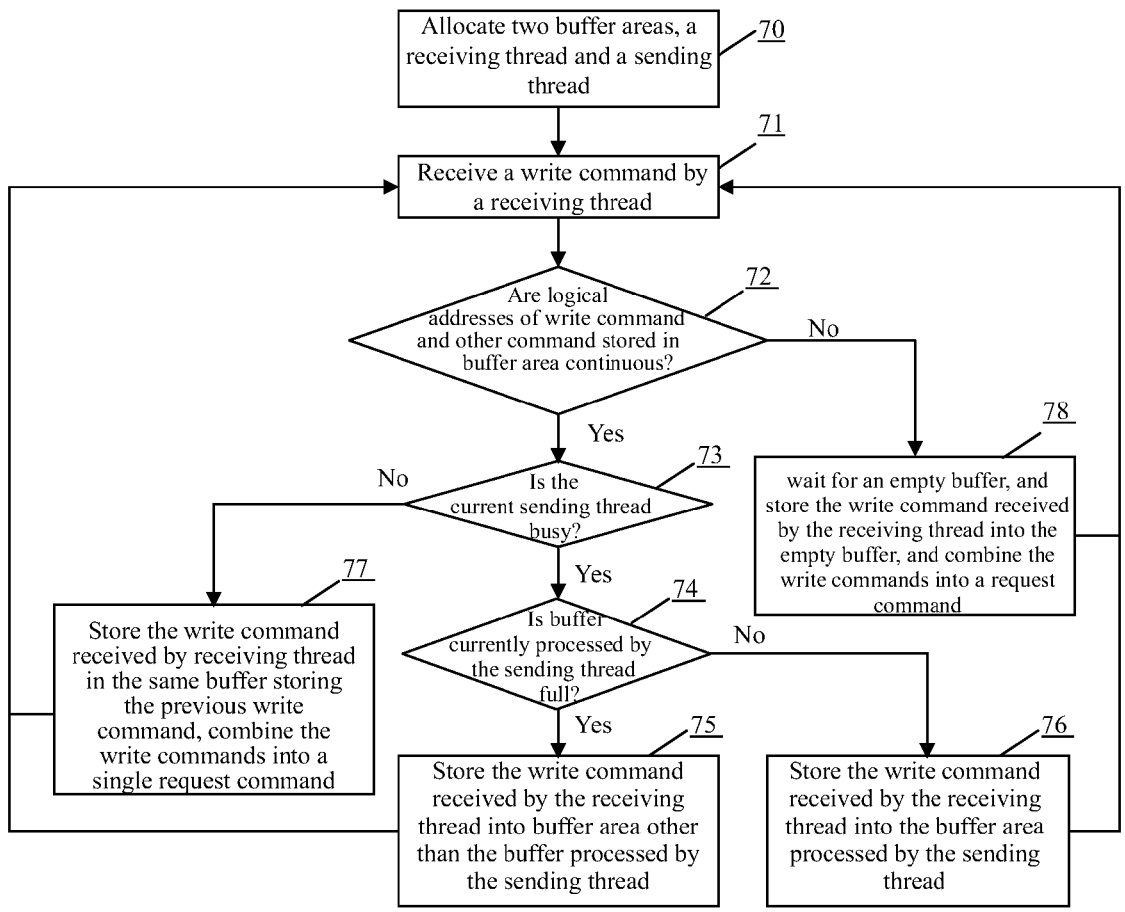
FIG. 7 illustrates a flow chart of a method for expediting the speed of writing data into a USB storage device in accordance with another embodiment of the invention.

FIG. 7 illustrates a flow chart of a method for expediting the speed of writing data into a USB storage device in accordance with yet another embodiment of the invention. This embodiment adopts a plurality of buffer areas and combines a plurality of write commands of continuous addresses to improve the data writing speed of the USB storage device. In the FIG. 7, the method includes the steps of:

Step 70: allocating two buffer areas, respectively a receiving thread and a sending thread, wherein the receiving thread is provided for receiving a write command issued by a SCSI layer, and the sending thread is provided for sending a request command in the buffer area to a USB storage device.

Step 71: receiving a write command by the receiving thread.

Step 72: determining whether or not the logical addresses of the write command currently received by the receiving thread and the previous write command are continuous; if yes, go to Step 54, or else go to Step 75.

Step 73: determining whether or not the current sending thread is busy; if yes, then execute Step 54, or else execute Step 77.

Step 74: determining whether or not the buffer area processed by the current sending thread is full; if yes, then execute Step 55, or else execute Step 56.

Step 75: storing the write command received by the receiving thread into a buffer area other than the buffer area processed by the sending thread, and executing Step 71.

Step 76: storing the write command received by the receiving thread into the buffer area processed by the sending thread, and executing Step 71.

Step 77: storing the write command received by the receiving thread into the same buffer area that stores the previous write command, combining the write commands into a request command, and executing Step 71.

Step 78: waiting for an empty buffer area, storing the write command received by the receiving thread into the empty buffer area, combining the write commands into a request command, and executing Step 71.

The above-mentioned buffer management method can be used together with the method as shown in FIG. 4. If two 1-Mbyte memories are used for the buffering purpose, the data writing speed of the USB storage device is increased from 14 M bytes/s~15M bytes/s to 20M bytes/s~21M bytes/s.

While the invention has been described by way of examples and in terms of preferred embodiments, it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements and procedures.

What is claimed is:

1. A method for expediting data access of a universal serial bus (USB) storage device, comprising:
   receiving an access command issued by a small computer system interface (SCSI) layer from a bulk transfers layer;
   determining whether or not the USB storage device has a continuous data access status;
   responsive to determining the USB storage device not having a continuous data access status, determining whether or not a memory space to be accessed and corresponding to the access command is greater than a threshold value; and
   based on whether the memory space of the access command is greater than a threshold value, performing one of:
      sending a command block wrapper (CBW) to the USB device to execute a continuous data access;
      performing a standard USB data access procedure;
   responsive to determining the USB storage device having a continuous data access status, determining whether or not logical addresses of the current access command and a previous access command are continuous;
   responsive to determining that logical addresses of the current access command and a previous access command are not continuous, performing the steps of:
      stopping the continuous data access, and
      setting the USB storage device to a status other than the continuous data access status.

2. The method of claim 1, further comprising:
   responsive to determining that logical addresses of the current access command and a previous access command are continuous, performing a continuous data access procedure without sending a command block wrapper (CBW) to notify the USB storage device.

3. A method for expediting data access of a universal serial bus (USB) storage device, comprising:
   receiving an access command issued by a small computer system interface (SCSI) layer from a bulk transfers layer;
   determining whether or not the USB storage device has a continuous data access status;
   responsive to determining the USB storage device not having a continuous data access status, determining whether or not a memory space to be accessed and corresponding to the access command is greater than a threshold value; and
   based on whether the memory space of the access command is greater than a threshold value, sending a continuous command block wrapper (CBW) to the USB device to execute a continuous read/write operation and setting an indicator to specify a continuous data access status.

* * * * *